(12) United States Patent
Marquina et al.

(10) Patent No.: US 8,934,526 B2
(45) Date of Patent: Jan. 13, 2015

(54) IMPROVEMENTS RELATING TO EQUALIZERS

(76) Inventors: Miguel Marquina, Bristol (GB); Chris Born, Bristol (GB); Ben Willcocks, Bristol (GB); Andrew Sharratt, Bristol (GB); Allard Van Der Horst, Monmouthshire (GB)

(*) Notice: Subject to any disclaimer, the term of this patent is extended or adjusted under 35 U.S.C. 154(b) by 362 days.

(21) Appl. No.: 12/825,034

(22) Filed: Jun. 28, 2010

(65) Prior Publication Data

US 2011/0317753 A1 Dec. 29, 2011

(51) Int. Cl.
H03H 7/30 (2006.01)
H04L 25/03 (2006.01)
H04L 25/02 (2006.01)

(52) U.S. Cl.
CPC ........ H04L 25/0307 (2013.01); H04L 25/0262 (2013.01); H04L 2025/03668 (2013.01); H04L 2025/03745 (2013.01)
USPC ........... 375/232; 375/229; 375/230; 375/231; 375/233

(58) Field of Classification Search
CPC .......... H04L 2025/03433; H04L 2025/03535; H04L 2025/03592; H04L 2025/03598; H04L 2025/003656; H04L 2025/03662; H04L 2025/03668; H04L 2025/03681; H04L 25/037; H04L 2025/03726; H04L 2025/03732; H04L 2025/03764; H04L 2201/00; H04L 202/03656; H04L 202/03668; H04H 21/0012
USPC ............ 375/229–233, 350; 708/323; 370/286
See application file for complete search history.

(56) References Cited

U.S. PATENT DOCUMENTS

| 4,759,035 A | * | 7/1988 | McGary et al. ................ 375/230 |
| 6,341,166 B1 | | 1/2002 | Basel |
| 6,714,587 B1 | | 3/2004 | Van Houtum et al. |
| 7,170,930 B2 | | 1/2007 | Denny et al. |
| 8,064,509 B1 | * | 11/2011 | Cops et al. ..................... 375/229 |
| 8,315,298 B2 | * | 11/2012 | Aziz et al. ..................... 375/232 |
| 8,432,959 B2 | * | 4/2013 | Aziz et al. ..................... 375/232 |
| 2002/0021750 A1 | * | 2/2002 | Belotserkovsky et al. ... 375/232 |
| 2004/0259605 A1 | * | 12/2004 | Quigley et al. ................ 455/574 |
| 2008/0013752 A1 | | 1/2008 | Stephens |
| 2008/0304510 A1 | * | 12/2008 | Qu .................................. 370/463 |
| 2009/0097538 A1 | | 4/2009 | Aziz et al. |
| 2009/0110045 A1 | * | 4/2009 | Aziz et al. ..................... 375/232 |

FOREIGN PATENT DOCUMENTS

WO 2005/091582 A1 9/2005

* cited by examiner

Primary Examiner — Sophia Vlahos
(74) Attorney, Agent, or Firm — TIPS Group

(57) ABSTRACT

Methods and apparatus adapting equalizers for compensating for signal distortion of a received digital signal are disclosed. The method comprises deriving equalizer settings for a received signal, determining at least one signal parameter of said received signal; and storing the derived equalizer settings together with an indication of the signal parameter. The signal parameter could, for instance, comprise the data rate of the signal. If the signal parameter changes the equalizer is configured to use any stored settings which are appropriate for the new signal parameter. Thus, rather than start an entirely new equalizer adaptation routine every time the signal parameter changes the equalizer will use any stored settings which are appropriate for the changed parameter.

7 Claims, 4 Drawing Sheets

IMPROVEMENTS RELATING TO EQUALIZERS

The present invention relates to adaptive equalizers for compensating for signal distortion introduced by a communications channel.

In a conventional binary, serial data link between a transmitter and a receiver each 'bit' of information is encoded by the transmitter as the polarity of the signal. Depending on the nature of the transmitter and the receiver the signal which is transmitted may, for instance, be an electrical signal or optical signal and the signal may be transmitted via any suitable channel, for example via free space or via a suitable guide medium such as a conductive wire or fibre optic cable. The data is typically transmitted at a fixed rate, for an established link, with each data bit occupying a period of time equal to the bit period. The receiver is required to determine the polarity of each bit received in order to correctly recover the data sequence. A simple receiver will have a single threshold placed half way between the average '1' level and the average '0' level. The input signal will be sampled at the middle of each bit period to recover the data.

One source of signal corruption in the receiver is noise. This adds a random component to the received signal which will cause errors in the received signal if it is large enough to cause the received signal to be on the wrong side of the decision threshold when the signal is sampled.

A second source of signal corruption is intersymbol interference (ISI). The channel that the signal is transmitted through can cause the energy in one bit period to spread into other bit periods. ISI can be characterised in terms of the impulse response of the channel. A channel will introduce significant ISI if the impulse response contains significant energy greater than +/−½ a bit period from the main peak. ISI means that the amplitude of the signal at the sampling point is no longer dependent only on the polarity of the current bit, but also on the sequence of bits before and after the current bit. Bit sequences which cause the signal to have a smaller amplitude at the sampling point will increase the probability of errors occurring in receiver. In extreme cases, ISI can cause errors in the received signal even in the absence of noise.

In order to minimise the impact of ISI on the error rate, an equaliser can be used to cancel out the effect of it. The equalizer may be implemented as part of a receiver or arranged as a repeater to receive data and retransmit an signal which compensates for upstream ISI towards a receiver.

A common type of equaliser is the Feed Forward Equalizer/Decision Feedback Equalizer (FFE/DFE) as shown in FIG. 1.

The FFE cancels out precursive ISI, that is energy which has spread from bits which were transmitted after the bit currently being sampled. The analogue signal received at the receiver/equalizer input is sampled and this input signal 101 is passed through a tapped delay line, comprising a series of taps 102 and delays 103 clocked at the bit rate. The output from each tap 102 is input to a multiplier 104 which multiplies the output by an appropriate gain (Wn1, Wn2) for that tap. The gain adjusted outputs from all the taps are then input to a summation block 105. An N bit FFE can null precursive ISI which spreads up to N bits before the main peak. The tap coefficients Wn1 to WnN are adjusted to achieve this nulling. A negative tap coefficient, Wnx, is required to compensate for an impulse response which has a positive polarity x bit periods from the main peak and vice versa.

The DFE cancels out postcursive ISI, that is energy which has spread from bits which were transmitted before the bit currently being sampled. The quantised output data 106 is fed back through a second tapped delay line, consisting of taps 107 and delays 108, clocked at the bit rate. The quantised output of each tap passes via a multiplier 109, where an appropriate gain (Wp1, Wp2) is applied, before being input into the summation block 105. An M bit DFE can null precursive ISI which spreads up to M bits after the main peak. The coefficients Wp1 to WpM are adjusted to achieve this nulling.

It is also possible to correct for postcursive ISI using by extending the FFE, rather than using a DFE.

The output from the summation block 105 is input to a comparator 110 where it is compared to a threshold level to decide whether the current bit represents a '1' or a '0'.

The output of comparator 110 provides the quantized output signal 106, which has been equalized for channel distortion.

In order for the equaliser to correct for the ISI, the tap coefficients must be set appropriately for the channel. Some communication standards involve a training period during which the transmitter sends a predefined data sequence to the receiver in order to train the equaliser. However many communication standards, such as Fibre Channel and 10 G Ethernet for example, do not allow for such a training period. The equaliser must therefore be trained on live data.

One method of which can be used to adapt an FFE/DFE using live data is described in U.S. Pat. No. 7,170,930. The method compares the output of the summation block with upper and lower thresholds, using comparators, 111 and 112 to classify the adjusted bit signal as either a hard (high confidence) or soft (low confidence) bit. The control logic 113 makes a small change to each tap weight each time a soft bit is received and adjusts the weightings so as to improve the confidence of the current bit. The skilled person will however be aware of various other methods by which the equalizer coefficients may be determined.

Such an equalizer is often referred to as an adaptive equalizer, since it is able to adjust itself to the characteristics of the channel and the transmitter in equalizing the received signal. The equalizer adapts the tap coefficients and gain blocks to compensate distortion, inter-symbol interference (ISI), attenuation, jitter, etc for a specific transmit signal. It will of course be appreciated that FIG. 1 shows one implementation of an adaptive equalizer and other implementations exist. In particular the input signal may be sampled using an analogue to digital converter and the equalization applied by digital signal processing. In general however an adaptive equalizer will be arranged to determine settings for the equalizer, e.g. weighting coefficients, gain values etc. that produce a digital output signal which is compensated for distortion.

It will be clear that the equalizer settings may differ from channel to channel. Thus an equalizer which can receive data via multiple channels will require different settings for each channel. The equalizer settings will also vary, for any given channel, if the signal parameters of the transmitted signal change. For example, changes in peak amplitude, pre-emphasis, falling and rising edge timing and/or data rate of the transmitted signal will force the equalizer to re-adapt itself to these modifications.

In some communication standards, when the signal parameters are changed by a transmitter, a certain amount of time is allowed for the receiver to recover the transmission. An example is the Fibre Channel (FC) communication standard, in which a transmitter sequentially varies the transmitted data rate until both ends of the transmission agree the data rate which will be used to establish the link. Typically the receiver has only a short period of time in order to establish a link at any given rate. For example, the FC standard limits the time to recover the transmitted signal to 30 ms.

This short period is intended to allow the receiver to establish a link with the transmitter. If the receiver fails to establish a link during this period the transmitter assumes that the receiver is unable to support that data rate and a lower data rate is used. Thus the more time the equalizer takes to adapt to the signal parameters the less time that the receiver will have to establish the link. However, the adaptation of the equalizer settings needs to be accurate enough to obtain an acceptable error rate, typically $10^{-12}$ errors per bit transmitted. Thus achieving a rapid adaptation of accurate equalizer settings is important.

The present invention therefore provides methods and apparatus for equalizer adaptation.

According to one aspect of the invention there is provided an adaptive equalizer configured to: derive equalizer settings for a received signal; determine at least one signal parameter of said received signal; and store said derived equalizer settings together with an indication of said at least one signal parameter, wherein: in the event that said at least one signal parameter changes, the equalizer is configured to use any stored settings which are appropriate for the new signal parameter The equalizer of the present invention derives equalizer settings that apply for a received signal and also determines at least one signal parameter of the received signal, such as data rate for example. The settings that are derived for the signal are stored along with an indication of the at least one signal parameter. Thus the equalizer stores, for a particular set of signal parameters, the equalizer settings that applied.

If one or more signal parameters then change, for example if the data rate changes, the equalizer is configured to use any stored settings that are appropriate to the new signal parameters. The stored settings are used as an initial setting for the equalizer, i.e. the equalizer settings are adjusted to match the stored settings. These adjusted settings will then be adapted as necessary in accordance with normal adaptation processes. By using the stored settings the time taken for the equalizer to adapt to the new signal parameters can be improved.

In a conventional adaptive equalizer the equalizer may be arranged to reset the equalizer settings to default values if some changes to signal parameters are detected. This will require the adaptation process to start again for the new signal parameters. However, the process of adapting the settings to be optimised for the new signal parameters may take some time. The adaptation process may involve making a series of small adjustments to the settings based on the bits received. If the new settings that are required are significantly different from the default settings, because there is a reasonable amount of ISI, many adjustments may be required which can take some time.

Alternatively, changes to some signal parameters may simply be dealt with by the usual adaptation process. Thus if a change in some signal parameter occurs, and the current equalizer settings are not optimal, the adaptation process will change the settings to optimise the settings for the new signal parameters. However, immediately after the change in signal parameter the equalizer will still be adapted to the old signal. Depending on the nature of the change of signal parameter the equalizer settings which are optimised for the signal before the change may actual be counter-productive for the new signal which may mean that adapting to the new signal may take longer than would be the case for simply resetting the equalizer settings.

By contrast the equalizer of the present invention uses any stored settings that are available which are appropriate for the current signal as the initial settings. The equalizer may therefore make a step change to the settings, rather than the normal gradual adjustment to some settings, to use settings which it is known are appropriate for the new signal parameters. Whilst the stored settings may not be the exact settings required for the new signal parameters they may represent a better starting point than the default settings or the settings which were adjusted for the signal prior to the change in signal parameter. Thus the convergence process to derive settings optimised for the new signal parameters may take much less time than would otherwise be the case. This therefore ensures that fast and accurate adaptation can occur following a change in signal parameters but without requiring very fast acting hardware.

The stored equalizer settings are settings that are derived in use by operation of the adaptive equalizer. If the signal parameters for a signal remain constant for the time taken for the equalizer to converge to a solution, i.e. for the setting to reach a steady state, the settings will represent the optimised settings for a signal having that signal parameter. However in some instance the signal parameter may change rapidly and thus the equalizer may not have time to reach a fully developed solution in the time between the change in signal parameters. In the equalizer of the present invention the settings that are derived in the time available will be stored. This means that, in the situation where the signal parameters change in a repeated way, the equalizer can use the previous settings the next time the same signal parameters are experienced to benefit from the progress previously made.

As an example consider that in a negotiation process to establish a data link the data rate of the signal is changed after a short time t but that the various data rates are repeated in a cycle. Suppose that the equalizer takes a time $T>t$ to reach a solution. In a conventional equalizer every time the data rate changes the equalizer settings are reset. Thus for each cycle of the data rate the equalizer needs to start again and thus it will never reach a solution and thus may not provide the required accuracy at higher data rates. However the equalizer of the present invention will store the settings for each data rate at the end of each period t at that data rate. When each data rate is repeated the stored settings will be retrieved and progress towards a solution will occur. If, for example $T<2t$, then on the first repeat of the data rates the equalizer may reach the solution and thus the received signal may be accurate enough to establish a link at the high data rates.

If, in response to a detected change of signal parameter, no derived settings have been stored that are appropriate for the new signal parameters, a default setting may used as an initial setting. In other words in the event that no stored settings which has been derived in use are suitable the equalizer settings may be reset to a default setting rather than being left at the settings derived for the signal prior to the change in parameter. In one embodiment the method may comprise initially storing, for each combination of signal parameters, default settings. These may be replaced, in use, by settings derived by the equalizer. In this way there will always be stored settings for the particular signal parameters—which will be default settings if not replaced with actual settings derived in use.

In another embodiment however the equalizer may determine whether there are any stored settings which have been derived in use and which are appropriate to the new signal parameters. In this embodiment the equalizer therefore effectively determines whether there are stored settings which would make a good starting point for settings given the new signal parameters. For some signal parameters the only appropriate settings may be those in which the relevant parameter is an exact match. For example if the signal parameters comprise data rate then stored settings may be deemed appropriate only if the data rate of the stored setting is exactly the same as the newly determined data rate.

However for at least some signal parameters, the appropriate settings may include those in which the value of the relevant parameter is within a certain range of the new signal parameter. For example if the signal parameter comprises peak amplitude some stored settings may be deemed appropriate if they relate to a peak amplitude within a range, for example ±10%, of the peak amplitude determined for the new signal. For some signal parameters the appropriate settings may simply be those for which the relevant parameter is closest in value to the newly measured parameter.

The skilled person will be well aware of various signal parameters that may affect the characteristics of the received signal and which, if varied, would require a change of equalizer settings. The at least one signal parameter that is determined may comprise any or all of the data rate; peak amplitude, pre-emphasis, and edge timing, i.e. rising edge and/or falling edge timing of the received signal.

The transmission channel on which the data is received may also comprise a signal parameter. Thus the equalizer of the present invention may store settings derived for each of a plurality of channels so that, when data is received via a particular channel, stored settings applicable to that channel may be used.

The skilled person will appreciate however that in some applications there may be a limit as to how long a particular set of equalizer settings may be applicable. Changes to the channel over time, such as temperature variations of a fibre channel for example, may mean that any set of stored equalizer settings is only applicable for a relatively short period of time. For example if the equalizer receives data from a specified transmitter via a specified channel the relevant equalizer settings may be stored along with the relevant signal parameters. If at some time later the equalizer receives a signal from the same transmitter via the same channel with the same parameters the stored equalizer settings may be used. However if there is a gap of the order of hours between the two separate transmission the channel characteristics may have changed significantly and the stored settings may be no better, and possible worse, then the default settings. The Equalizer may therefore be arranged to maintain the stored settings only for a relatively short period of time.

The equalizer of the present invention is therefore particularly applicable to changes in received signal which occur over relatively short timescales. The equalizer may therefore be configured to reset all stored equalizer settings to default values if no data is received for a predetermined period of time, for example a few seconds, say of the order of 3 s or so.

The step of storing the derived equalizer settings may comprise periodically determining whether said at least one signal parameter has changed and, if not, storing the current equalizer settings. As will be understood by one skilled in the art a change in some signal parameters may take some time to be detected. Detection of a change in signal parameter may be based on a statistical analysis and thus may require a relatively large number of samples at the new parameter to be detected. By the time that the change in signal parameter is detected however the equalizer may have already have started adapting to the new signal parameters. Thus the equalizer settings will no longer be optimised for the previous signal parameters but will represent some transitory settings. The equalizer may therefore only store the settings if no change in signal parameter is detected.

Depending on how long it takes a change in signal parameter to be detected it is possible that a change in signal parameter may have occurred but not yet be detectable at the time that the equalizer settings are stored. However the equalizer may have started to adapt to the new signal parameters. Any change in the equalizer settings at this point is likely to be small and thus the settings will still be a good starting point for if the signal parameters change back. However if desired, in one embodiment the current equalizer settings may be recorded at a first time in a buffer. At a second time, a short time later, it may be determined whether the signal parameter(s) has changed; and, if the signal parameter has not changed, the contents of the buffer may be stored. In other words the current settings are stored in a buffer at regular intervals but only committed to storage if the signal parameters are determined a short time later not to have changed. The period of time between the first time and the second time may be as short as required to detect any change in signal parameters. The buffer may be any suitable memory device for storing data for a short period of time and may be internal or external to the equalizer.

The equalizer may comprise a memory for storing the derived settings or may be configured to use an external memory, for example a memory of a receiver device in which the equalizer is located. Again any type of memory may be used. It will be appreciated however that relatively quick access is required to the settings stored in memory in order to speed up the adaptation process.

According to another aspect of the invention there is provided an adaptive equalizer configured to determine at least one signal parameter of a received signal and, in the event that said at least one signal parameter changes to update the equalizer settings based on settings stored for said at least one signal parameter and, in the event that the said at least one signal parameter does not change to update the stored settings for said at least one parameter.

The equalizer according to this aspect of the invention offers all of the same advantages and can be implemented in the same embodiments as the first aspect of the invention.

The invention also provides, in another aspect, a method of equalizer adaptation comprising the steps of: deriving equalizer settings for a received signal; determining at least one signal parameter of said received signal; storing said derived equalizer settings together with an indication of said at least one signal parameter, and: in the event that said at least one signal parameter changes, adjusting the equalizer settings based on any stored settings which are appropriate for the new signal parameter.

The method of this aspect of the invention offers the same advantages and can be used in the same embodiments as described above.

The method may be used with to improve adaptation times in a range of applications, for example the method may be used to detect changes in data rate and adjust equalizer settings accordingly for example for equalizing a signal used for rate negotiation, for example in a fibre channel communication protocol.

The invention will now be described by way of example with reference to the following drawings, of which:

Figure 2:
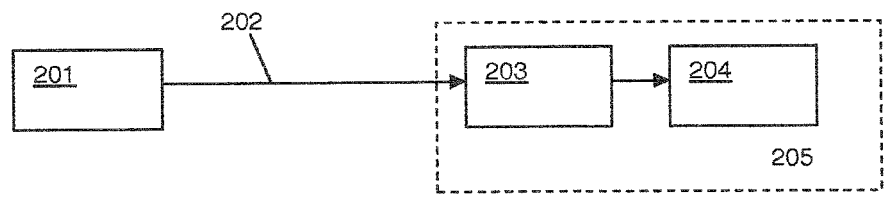
FIG. 2 illustrates a communication channel comprising an equalizer.

Typically an equalizer is arranged to receive data via at least one channel such as shown in FIG. 2. A transmitter 201 is arranged to transmit data via a channel 202, for example a Backplane Printed Circuit Board (PCB) link to a receiver. An equalizer 203 is arranged to receive the data transmitted via the channel, and to provide an equalized, quantized digital signal to a receiver 204. In some embodiments the equalizer 203 is a separate unit to the receiver 204 and is arranged as a repeater. In other embodiments the equalizer may be part of a receiver unit 205 in which case the equalizer module receive a signal detected by a detector of the receiver unit 205 and may provide the equalized signal to a unit 204 which establishes the data link.

Figure 1:
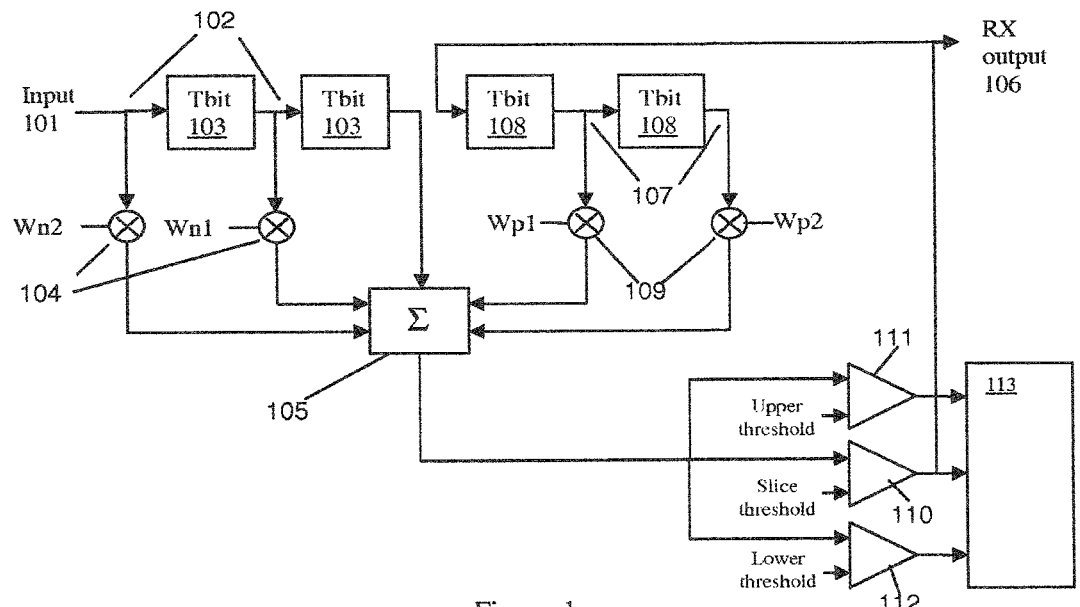
FIG. 1 illustrates a conventional adaptive equalizer.

FIG. 1 shows a conventional FFE/DFE equalizer as described above. FIG. 1 shows an adaptive equalizer wherein the equalization is applied to the received signal in the analogue domain. It will be appreciated that alternatively the signal processing i.e. forming an adjusted bit signal and/or comparison with the thresholds, may be performed in the digital domain with digital weightings applied to different bit periods.

The equalizer may therefore comprise an analogue to digital converter for converting the input signal to a digital signal and appropriate digital circuitry. In either case this type of equalizer adapts the settings, e.g. tap weighting coefficients, gain values etc. based on the received data and thus can adapt itself accurately and efficiently on live data.

However some data communication protocols allow a short time to establish a data link between transmitter 201 and receiver 204.

Figure 3:
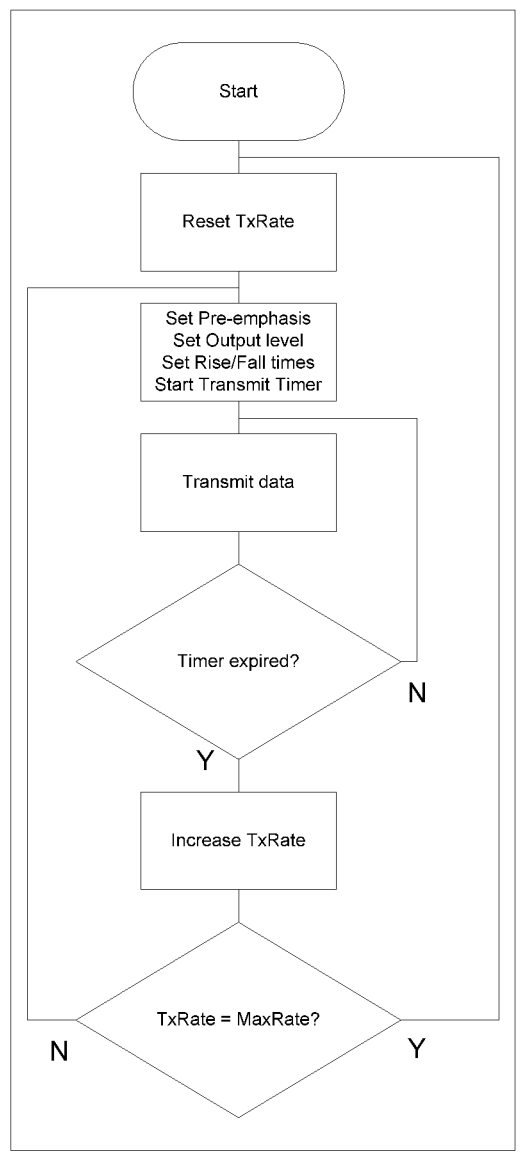
FIG. 3 illustrates the transmitter flowchart regarding rate negotiation for establishing a data link.

FIG. 3 shows a flowchart illustrating the principle of the transmitter behaviour during link establishment according to the Fibre Channel communication protocol. FIG. 3 shows how the transmitter (201) will initially send data at a range of transmit data rates (TxRate) for a set time (Transmit Timer). Each TxRate will have a specified range of properties: rise/fall time, output swing (i.e. peak amplitude), amount of pre-emphasis, etc.

For the Fibre Channel protocol the receiver has 30 ms attempt to establish a data link. During this period receiver module 204 which manages the protocol (generally an ASIC) is required to establish the link. Also during this time equalizer 203 should adapt to the channel so that the receiver module 204 receives accurate data. The more time the equalizer spends to adapt, the less time the receiver ASIC 204 will have to establish the link. Hence, the adaptation time of the equalizer is important. However the adaptation needs to be accurate enough to obtain an acceptable error rate, typically $10^{-12}$ errors per bit transmitted.

The present invention therefore provide an equalizer that improves equalizer adaptation times by storing previously derived settings along with the corresponding signal parameters and, in the event that a signal parameter changes, uses appropriate stored settings as the starting point for adaptation rather than re-setting the equalizer.

While in principle it is possible to devise an architecture which allows for having short time of adaptation, there are a number of benefits to be able to relax this requirement. In particular implementation complexity can be reduced, as very fast adaptation does require additional hardware resources and the quality of the adaptation can be optimized when more time is available, as more information can be received, better characterizing the nature of the channel.

For the purposes of explanation examples will be given in which the signal parameter that changes is the data rate. However it will be understood that the invention is applicable to other detectable changes in signal parameter that affect equalizer settings. An embodiment using the Fibre Channel (FC) protocol will be described but the invention is also applicable to other implementations where the transmitter varies its output sequentially.

As it was mentioned above, in FC, there is an algorithm called auto-negotiation by which both ends of the transmission negotiate the data rate which they are going to use to establish the link. Every 150 ms, each transmitter sequentially change the data rate covering all its supported rates. Meanwhile, the FC receiver cycles every 30 ms through every of its supported rates in search of a data rate which matches the transmitted one.

Figure 4:
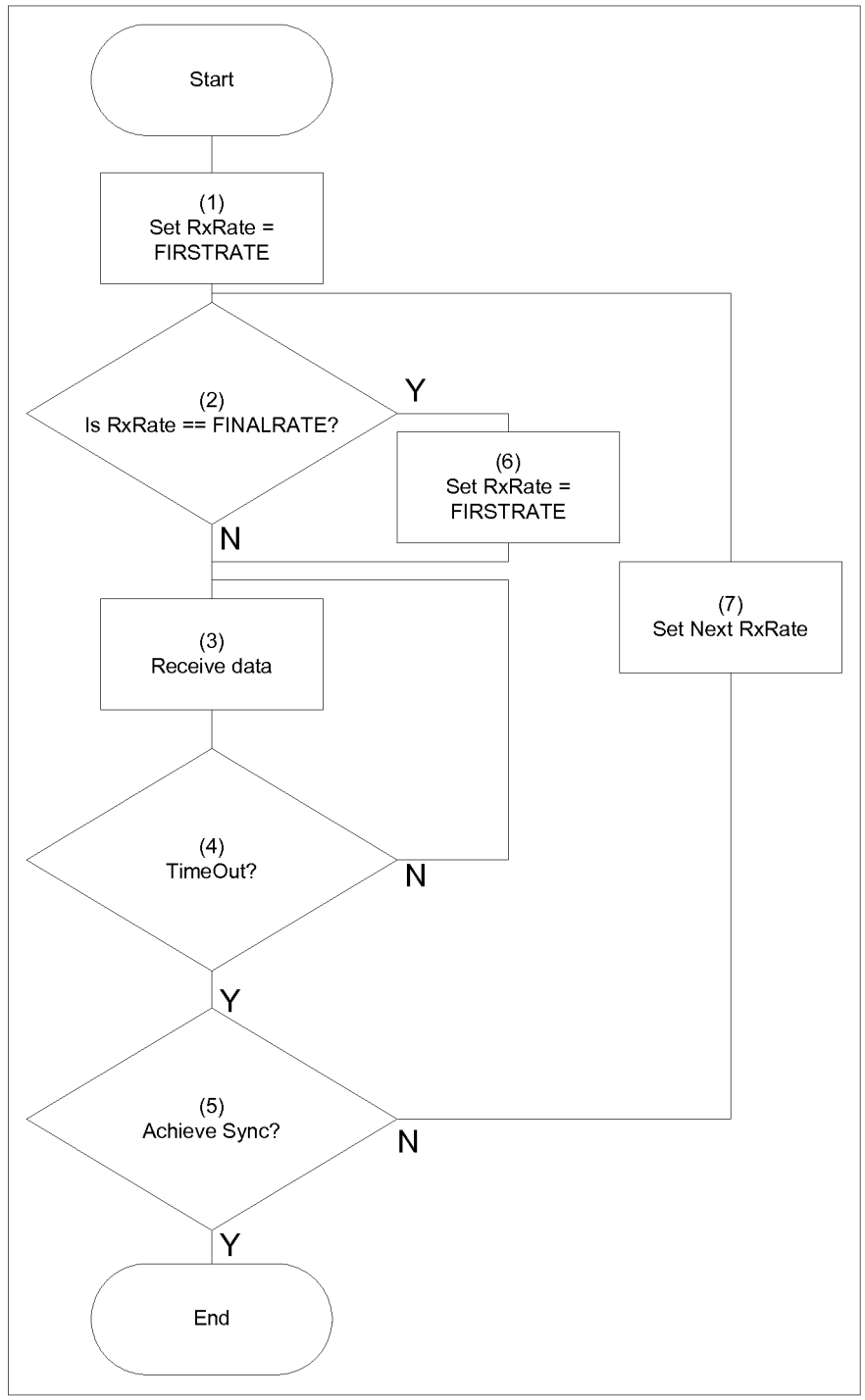
FIG. 4 illustrates the receiver flowchart regarding rate negotiation for establishing a data link.

FIG. 4 shows a flow chart of the receiver (204) behaviour during rate negotiation. The relevant receive rate is set and data is received. The equalizer settings are adapted according to the relevant adaptation process for the equalizer. Periodically the equalizer settings are stored, along with an indication of the relevant data rate. If no change of rate is detected the adaptation process is performed until the settings have converged, i.e. a steady state equalizer solution is reached. However if the data rate is changed, the adaptation process may begin for the new data rate but with the settings for the previous data rate stored for future use. These settings may be thus settings that have not yet converged to a solution but represent progress towards a solution. The next time that the same data rate is set the stored settings will be retrieved and will form the starting point for further adaptation.

Figure 5:
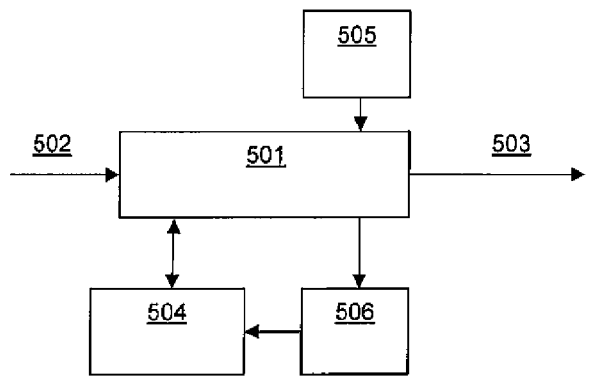
FIG. 5 illustrates an embodiment of the present invention.
Figure 6:
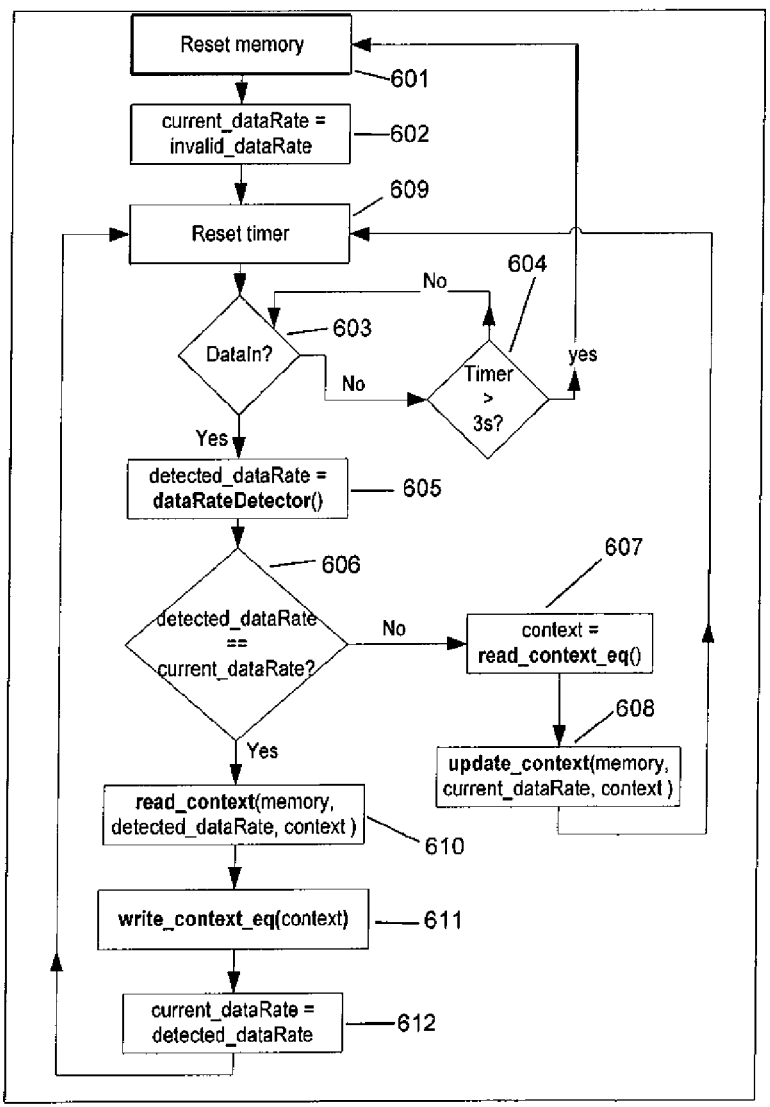
FIG. 6 illustrates a flowchart of a method according to another embodiment of the invention.

FIG. 5 illustrates an equalizer according to an embodiment of the present invention and FIG. 6 shows a flowchart of the method for using the stored information.

FIG. 5 shows an adaptive equalizer 501, which may for example be generally an equalizer as shown in FIG. 1, receiving an input signal 502 and arranged to provide an equalized output signal 503. The equalizer is connected to a memory 504 for storing equalizer settings.

This memory is arranged to store the settings for the equalization indexed for all available data rates. Initially the memory is reset so that the settings stored for all data rates are default values of the equalizer as indicated by step 601 shown in FIG. 6. A value called 'current data rate' is also flagged as an invalid data rate as indicated by step 602 shown in FIG. 6. The first two steps of FIG. 6 illustrate initialising of the algorithm.

The equalizer 501 is also connected to a timer 505. In practice the timer may be part of the equalizer control logic. The timer is used by the equalizer to reset the memory. As shown in FIG. 6 if no data is received for a period such as 3 s as indicated by steps 603 returning 'No' and 604 returning 'Yes' then the memory is reset at step 601. In this embodiment the timer is used to reset the memory in case a new transmitter or new channel is connected to the equalizer. However other events for triggering the reset can be used and other sources like flags coming from a source external to the equalizer could be used. Further, in an embodiment in which multiple channels are connected to the equalizer it may not be possible to store equalizer settings for each channel.

When data is detected as indicated by step 603 returning 'Yes' the equalizer will adapt the equalizer settings as necessary. However the equalizer also determines whether the 'detected data rate' detected at step 605 is equal to the 'current data rate' value as indicated by step 606. When the data rate is first detected the detected data rate will always be different to the value of the 'current data rate' which was initialised as invalid, as indicated by step 606 returning 'No'. The equalizer therefore reads the relevant equalizer settings for the 'detected data rate' from the memory 504 as indicated by step 607, which initially will be the default settings, and uses them as the equalizer settings. The method then repeats, resetting the value of the 'current data rate' to the 'detected data rate' as indicated by step 608 and resetting the timer as indicated by step 609.

If, on any subsequent iteration, the data rate is still the same as the stored current data rate, as indicated by step 606 returning 'Yes', the equalizer settings are determined as indicated by step 610 and stored in the memory 504 as indicated by step 611 and the process repeats with the 'current data rate' set to the 'detected data rate' as indicated by step 612 and with the timer 505 being reset as indicated by step 609. If however the detected data rate is different to the current set data rate as indicated by step 606 returning 'No' the equalizer settings stored in the memory 504 are used instead as indicated by step 607.

An important aspect of the core of the algorithm is determination of the parameter of the transmitted signal, in this case the data rate. This block can run in parallel or in series with the equalization algorithm and may, for instance, be performed by control logic of the equalizer. Ideally, the algorithm should stop the equalizer just when data rate changes to avoid any changes due to the equalizer adapting to the new data rate. However, typically any changes in signal parameter will only be determined a short time after the actual change, with the result that the equalizer will begin to equalize to the new data rate. Therefore, the settings of the equalizer at this point will not be optimal. In order to cope with this issue, the method may "sample" the equalizer settings every time that the data rate hasn't been changed. When a data rate change is detected, the current settings are discarded without being stored and the settings corresponding to the new data rate are loaded into the equalizer. The only requirement is to "sample" the current settings faster than the data rate changes.

In one embodiment the method may involve storing the settings in a buffer 506 for a short time. Only if no subsequent change to the data rate is detected is the data in the buffer stored in memory 504. If the data rate changes within a short time of the data being stored in the buffer the data in the buffer may be discarded.

The invention claimed is:

1. An adaptive equalizer wherein equalizer settings are adjusted in response to a received signal, the adaptive equalizer comprising:
a working memory to initially store, for at least some signal parameters associated with the received signal, default values for equalizer settings;
a buffer coupled to said working memory; and
control logic responsive to the received signal and coupled to said working memory and said buffer to:
determine at least one signal parameter of said received signal;
derive equalizer settings for the at least one signal parameter of said received signal using stored default values as initial equalizer settings;
record the derived equalizer settings for the at least one signal parameter at a first time in the buffer;
determine at a second time whether the at least one signal parameter has changed, and if said at least one signal parameter has not changed, store the contents of the buffer along with the at least one signal parameter in said working memory, and if said at least one signal parameter has changed, discard the contents of the buffer and use any stored settings which are appropriate for the changed signal parameter to adjust the equalizer settings; and
reset said stored derived equalizer settings to said default values if no data is received for a predetermined period of time;
wherein storing derived equalizer settings at said first time in said buffer instead of said working memory reduces an error caused by a change in the signal parameter which has occurred but has not yet been detected.

2. An adaptive equalizer as claimed in claim 1 wherein said at least one signal parameter comprises at least one of: transmission channel, data rate, peak amplitude, pre-emphasis, and edge timing.

3. A method of equalizer adaptation comprising the steps of:
storing, for at least some signal parameters associated with a received signal, default values for equalizer settings;
determining at least one signal parameter of said received signal;
deriving equalizer settings for the at least one signal parameter of said received signal using stored default values as initial equalizer settings;
storing said derived equalizer settings together with an indication of said at least one signal parameter and, when said at least one signal parameter changes, adjusting the equalizer settings based on any stored settings which are appropriate for the changed signal parameter, wherein storing said derived equalizer settings includes periodically determining whether said at least one signal parameter has changed and, if not, storing the derived equalizer settings; and
resetting said stored derived equalizer settings to said default values if no data is received for a predetermined period of time;
wherein the step of storing said derived equalizer settings comprises periodically recording the derived equalizer settings at a first time in a buffer separate from a working memory, determining at a second time whether said at least one signal parameter has changed, and if said at least one signal parameter has not changed, storing the contents of the buffer along with the at least one signal parameter in said working memory, and if said at least one signal parameter has changed, discarding the contents of the buffer;
wherein storing derived equalizer settings at the first time in said buffer instead of said working memory reduces an error caused by a change in the signal parameter which has occurred but has not yet been detected.

4. A method as claimed in claim 3 wherein said at least one signal parameter comprises at least one of: transmission channel, data rate, peak amplitude, pre-emphasis, and edge timing.

5. An adaptive equalizer system comprising:
an adaptive equalizer having a signal input and an equalized signal output and provided with control logic, wherein a received signal at said signal input is characterized by at least one signal parameter;
read/write memory coupled to said adaptive equalizer, wherein data is stored in and read from said read/write memory by said control logic, said data initially comprising default values for equalizer settings;
a buffer separate from said read/write memory and coupled to said adaptive equalizer and to said read/write memory, wherein contents are stored in said buffer by said control logic in response to derived equalizer settings for at least one parameter of the received signal; and
wherein said control logic is configured to periodically record derived settings of said adaptive equalizer at a first time in said buffer, determine at a second time whether said at least one signal parameter has changed, and if said at least one signal parameter has not changed, store said contents of the buffer along with said at least one signal parameter in said read/write memory, and if said at least one signal parameter has changed, discard said contents of the buffer;

a timer coupled to said control logic of said adaptive equalizer, wherein said timer is used to reset said read/write memory to said default values;

wherein storing equalizer settings at the first time in said buffer instead of said read/write memory reduces an error caused by a change in the signal parameter which has occurred but has not yet been detected.

6. An adaptive equalizer system as recited in claim 5 wherein said timer is separate from said adaptive equalizer.

7. An adaptive equalizer system as recited in claim 5 wherein said timer is a part of said adaptive equalizer.

\* \* \* \* \*